T. MAYHEW,

Assignor, by direct and mesne assignments, of two-thirds to R. SLEE & C. P. LUCKEY.

MOTOR.

No. 9,804.

Reissued July 12, 1881.

Inventor:

Theophilus Mayhew, by Dodgerson,

Attys.

Attest:

Walter S. Dodge.

S. P. Hollingsworth

UNITED STATES PATENT OFFICE.

THEOPHILUS MAYHEW, OF POUGHKEEPSIE, NEW YORK, ASSIGNOR, BY DIRECT AND MESNE ASSIGNMENTS, OF TWO-THIRDS TO ROBERT SLEE AND CHARLES P. LUCKEY, BOTH OF SAME PLACE.

MOTOR.

SPECIFICATION forming part of Reissued Letters Patent No. 9,804, dated July 12, 1881.

Original No. 217,392, dated July 8, 1879. Application for reissue filed May 28, 1881.

*To all whom it may concern:*

Be it known that I, THEOPHILUS MAYHEW, of Poughkeepsie, in the county of Dutchess and State of New York, have invented certain new and useful Improvements in Motors; and I do hereby declare the following is a full, clear, and exact description of the invention, that will enable others skilled in the art to which it appertains to make and use the same, reference being had to the accompanying drawings, and to the letters of reference marked thereon, which form a part of this specification.

The object of my invention is to produce a simple, cheap, and serviceable motor, adapted for use in churning and for various other purposes.

My improvements will be described as comprised in a motor wherein are a flexible diaphragm susceptible of being distended by the pressure of steam or other motive agent under control of a valve, and a lever impelled by the diaphragm and actuating the valve.

Figure 1:
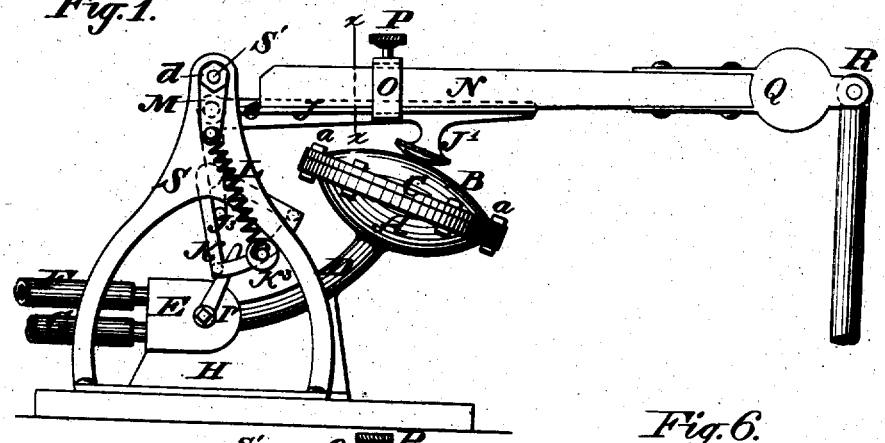
Figure 2:
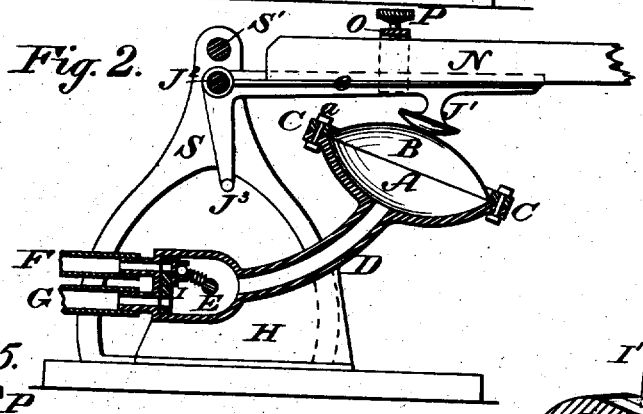
Figure 6:
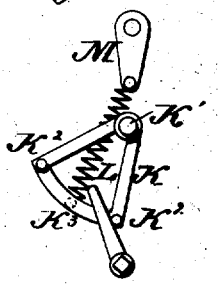
Figure 5:
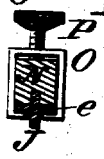
Figure 4:
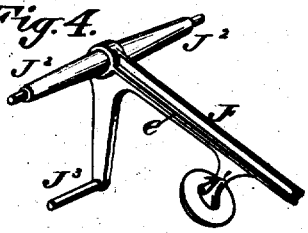
Figure 8:
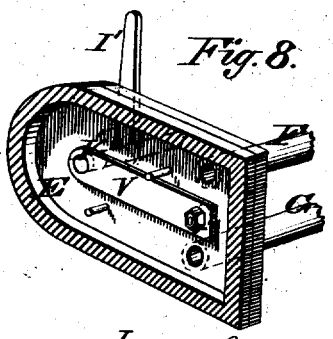
Figure 7:
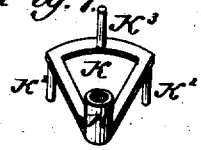
Figure 3:
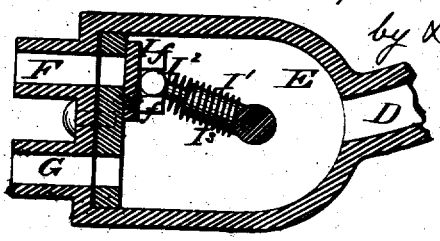

In the accompanying drawings, Figure 1 is a side view of a motor embodying my improvements. Fig. 2 is a central longitudinal section thereof. Fig. 3 is a central longitudinal section of the valve-chest and valve. Fig. 4 is a perspective view of the lever and its appurtenances, whereby motion is imparted from the flexible diaphragm. Fig. 5 is a transverse section of one arm of said lever and extensible arm applied thereto and appurtenances. Fig. 6 is a detail view of an auxiliary spring-motor and the rod of the valve which it operates. Fig. 7 is a perspective view of a lever comprised in the auxiliary spring-motor aforesaid, and Fig. 8 is a perspective sectional view of a valve-chest and valve mechanism of modified form.

Similar letters of reference designate corresponding parts in all the figures.

A designates a chamber, which may be of concave form, and is furnished with a flexible diaphragm, B, of india-rubber, leather, or other suitable material, secured in place by a clamping-ring, C, and bolts *a*.

D designates a pipe or conduit communicating with the chamber A, and serving to conduct steam or other motive agent to and from the same.

E designates a valve-chest communicating with the pipe or conduit D, and provided with an induction port or pipe, F, and an eduction pipe or port, G.

The chamber A, conduit D, and valve-chest E are shown as being made all in one piece, and with a base-piece or frame, H, whereby they are supported, and this will preferably be effected by casting them together.

Against the side or end of the valve-chest E, with which the induction-pipe F and eduction-pipe G communicate, is fitted a plate of brass or other suitable metal, having openings corresponding to the said induction and eduction pipes, and serving as a seat for a slide-valve, I. A packing of india-rubber or other suitable material is preferably arranged between the plate and the valve-chest, to preclude leakage, and the plate is secured in place by screws *b*. It is obvious that I am enabled by employing this plate to obviate the labor and expense incident to smoothing up the inside of the valve-chest.

The slide-valve I is actuated by a bell-crank or elbow-lever, I′, consisting of two arms located one inside and the other outside the valve-chest E, and mounted on a rock-shaft extending through the valve-chest. The arm inside the valve-chest is provided with a T-piece, $I^2$, the body of which fits in a cavity in the said arm, and the arms of which fit between lugs *f*, projecting from the back of the valve, and such T-piece is held against the valve by a spiral spring, $I^3$. Thus the radial motion of the lever is compensated for and the valve held to its seat.

In Fig. 8 I have shown the induction and eduction pipes F and G as communicating with a removable cover secured to the valve-chest by screws or bolts or otherwise. The valve in this instance consists of an arm, V, extending from a rock-shaft, V′, pivoted to the said cover, and limited in its motion by two stops, S, so that it may be swung into position to cover the inner end of either the induction or eduction pipe.

On the outer end of the rock-shaft V′ is another arm, which is acted upon to shift the valve. The two arms, with the rock-shaft, in effect constitute an elbow or bell-crank lever.

J designates a bell-crank or elbow lever, supported by two side frames, S, presently to be described, and having an abutment, J′, on its laterally-extending arm impinging upon the flexible diaphragm B.

It will be seen that the face of the chamber A is arranged at an angle to a horizontal plane, and when secured in proper position its face will be radial to the fulcrum of the bell-crank lever J. The diaphragm when distended by the motive agent impels the lever in one direction, and the weight of the lever or a weight applied to it impels it in the other direction.

It will be observed that the abutment J′ is rigidly affixed to the lever, and that it and the chamber A, to which the flexible diaphragm B is secured, are arranged in planes radial to the fulcrum of the lever J, and hence that the said parts operate in the most advantageous manner possible.

The abutment J′, as also the fulcrum shaft or journals $J^2$, are preferably cast in one piece, so as to be as simple and as little liable to become disordered as possible.

The downwardly-extending arm of the lever J sets in motion what I term an "auxiliary spring-motor," whereby the valve I is actuated. This auxiliary spring-motor comprises a lever, K, (shown as triangular in form,) pivoted by a fulcrum-piece, K′, at one end to one of the side frames, S, receiving within it a pin or stud, $J^3$, projecting from the downwardly-extending arm of the lever J, and provided at the lower portion with two pins or studs, $K^2$, projecting toward the valve-chest, and acting on the lever I′ of the slide-valve I.

L designates a spring (represented as of spiral form) suspended from a hanger, M, at a point above the fulcrum of the lever K, and connected to a stud or pin, $K^3$, extending from the lower portion of the said lever K about opposite its fulcrum. As the lever J swings to and fro its pin or stud $J^3$ comes in contact with side pieces of the lever K, and carrying it past a certain intermediate point in its line of travel allows the spring L to retract and complete the throw or swing of the lever with alacrity, thereby causing said lever, through the agency of one or other of its pins or studs $K^2$, to shift the valve I at the end of the stroke of the lever J, and without lost motion.

It will be seen that the spring L serves to shift the valve I in both directions, and as the said spring is arranged outside the apparatus it is readily accessible for adjustment or repairs.

The side frames, S, are open in the center, and severally consist in this instance of two legs converging toward and united with an upright body. The pin or stud $K^3$ of the lever K projects between the legs of one of the side frames, S, and the latter thus constitutes stops, whereby the movements of the auxiliary spring-motor are limited.

Elastic material, such as india-rubber, may be employed upon the pin or stud $K^3$, or the legs of the said side frame, S, to lessen the noise occasioned by the contact of these parts.

The hanger M, from which the spring L of the auxiliary spring-motor is suspended, is preferably adjustable, so as to cause the spring L to act on the lever K at the proper intermediate point in its throw or travel, and to provide for its adjustment I hang it from the end of a stretcher, S′, whereby the upper portions of the side frames, S, are connected and clamp it in position against the side frame adjacent to it by a nut, *d*, applied to the end of the stretcher.

It will be seen that by my invention I provide an exceedingly cheap and simple motor, having few parts, no unnecessary joints, and free from liability to become disordered. In order the better to adapt it for different purposes I preferably provide the laterally-extending arm of its lever J, whereby motion is transmitted from it, with an extensible arm or section, N. I have shown this extensible section N as grooved on the under side, so as to straddle the top of the laterally-extending arm of the lever J, and as resting at the sides upon longitudinal ribs *e*; and for securing said section in position I have represented a clamping device consisting of a frame, O, surrounding the same and projecting under the longitudinal ribs *e*, a set-screw, P, being employed to tighten it.

By loosening the set-screw P the extensible section N may be adjusted or removed at pleasure.

At the outer end of the adjustable section is a weight, Q, which, of course, is adjustable with the said section, and lugs R furnished with a cross-pin, whereby the lever may be attached to a churn-dasher or other article.

From the foregoing description it will be seen that the essential features of the device are a body or surface arranged to receive and to be moved by the pressure of the motive agent a vibratory lever actuated thereby, a valve for regulating the entrance and exit of the motive agent, and a spring or other auxiliary device controlled by the vibratory lever and serving to operate the valve.

While I have shown and described a weight for returning the lever to its normal position, it is apparent that any recognized mechanical equivalent of the weight may be employed.

Having thus described my invention, what I claim is—

1. The combination of a flexible diaphragm and chamber and a lever provided with an abutment extending to said diaphragm, the said diaphragm and chamber and the said abutment being located in planes radial to the fulcrum of the lever.

2. In a motor, the combination of a flexible diaphragm, a lever having a rigid abutment in contact therewith and impelled by said diaphragm in one direction, an adjustable weight for impelling the lever in the reverse direction, and a valve adapted to control the supply and exhaust of the motive agent.

3. The combination of a flexible diaphragm, a lever impelled thereby, and an extensible arm for said lever.

4. In a motor, the combination of a body or surface adapted and arranged to receive the pressure of the motive agent, a lever impelled in one direction thereby, means substantially such as described, capable of variation as to the force of its action, for impelling the lever in the reverse direction, and a valve adapted to control the supply and exhaust of the motive agent.

5. In a motor, the combination of a vibratory-weighted lever for transmitting motion, a valve adapted to control the inlet and outlet of the motive agent by which said lever is actuated, and an auxiliary motor controlled by the vibratory lever and adapted to actuate said valve.

6. In a motor, the combination of a vibratory lever for transmitting power, a valve adapted to control the inlet and outlet of the motive agent by which said lever is actuated, and an auxiliary motor controlled by the vibratory lever and adapted to actuate said valve.

7. In a motor, the combination of a body or surface adapted and arranged to receive the direct pressure of a motive agent, a vibratory lever for transmitting power, actuated thereby, a valve for regulating the supply and discharge of the motive agent, and an auxiliary motor controlled by the vibratory lever and serving to operate the valve.

8. In a motor, the combination of a body adapted and arranged to receive the direct pressure of a motive agent, a vibratory lever for transmitting power, actuated thereby, a valve for admitting and discharging said agent, and a spring-motor shifted past the center alternately in opposite directions through the agency of the vibratory lever, and serving to actuate said valve.

9. The combination of a flexible diaphragm, a valve for controlling the admission of a motive agent to act upon the same, and an auxiliary motor for shifting said valve in both directions.

10. The combination of a flexible diaphragm, a valve for controlling the operation of the same, and an auxiliary spring-motor for actuating said valve in both directions.

11. The combination of a flexible diaphragm, a valve controlling the operation of the same, and an elbow or bell-crank lever impelled by the diaphragm and actuating said valve.

12. The combination of a motor, a valve for controlling the operation of the same, and an elbow or bell-crank lever actuated by the motor, serving to shift the valve, and arranged outside the apparatus of which the above elements form part, where it is readily accessible.

13. The combination of a motor, a valve for controlling the operation of the same, a lever for shifting said valve, a spring for forcing said lever to one side when swung off its central position, and an elbow or bell-crank lever actuated by the diaphragm, and serving to swing the valve-shifting lever off its central position.

14. The elbow or bell-crank lever J, made in one piece and comprising an abutment, $J'$, journals $J^2$, and pin or stud $J^3$.

15. The valve-shifting lever, made in one piece, comprising the triangular frame-like body K, the fulcrum-piece $K'$, and the pins or studs $K^2$.

16. The combination, with a valve-chest, of a plate fitted to the side which communicates with the inlet and exhaust ports or pipes, a valve sliding upon the same, an elbow or bell-crank lever for shifting said valve, and an adjustable end piece on the arm of said lever, which bears against the valve.

17. The combination, with the arm of a lever provided with longitudinal ribs, of an extensible arm fitting upon said ribs, a slide embracing said extensible arm and engaging with the ribs on the main arm, and provided with a clamping device.

18. The combination, with a motor, of a valve for controlling the operation of the same, an auxiliary spring-motor for shifting said valve, and an adjustable hanger or support for the spring of said auxiliary motor.

19. The combination of a motor, a valve for controlling the operation of the same, an auxiliary spring-motor for actuating said valve, and stops for the said auxiliary spring-motor.

In testimony whereof I affix my signature in presence of two witnesses.

THEOPHILUS MAYHEW.

Witnesses:

JOHN L. DISBROW,

THEO. F. CLARK.